United States Patent
Escott et al.

(10) Patent No.: US 12,081,972 B2
(45) Date of Patent: Sep. 3, 2024

(54) PROTECTION OF SEQUENCE NUMBERS IN AUTHENTICATION AND KEY AGREEMENT PROTOCOL

(71) Applicant: QUALCOMM Incorporated, San Diego, CA (US)

(72) Inventors: Adrian Edward Escott, Reading (GB); Soo Bum Lee, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/746,495

(22) Filed: Jan. 17, 2020

(65) Prior Publication Data

US 2020/0236548 A1 Jul. 23, 2020

Related U.S. Application Data

(60) Provisional application No. 62/794,191, filed on Jan. 18, 2019.

(51) Int. Cl.
*H04W 12/06* (2021.01)
*H04L 9/12* (2006.01)
(Continued)

(52) U.S. Cl.
CPC .............. *H04W 12/06* (2013.01); *H04L 9/12* (2013.01); *H04L 9/3242* (2013.01); *H04W 12/0431* (2021.01); *H04W 56/001* (2013.01)

(58) Field of Classification Search
CPC ............ H04L 2209/80; H04L 63/0869; H04L 63/1466; H04L 9/0838; H04L 9/12;
(Continued)

(56) References Cited

U.S. PATENT DOCUMENTS

| 7,246,236 | B2 * | 7/2007 | Stirbu | H04L 63/0869 |
| | | | | 713/168 |
| 7,269,730 | B2 * | 9/2007 | Stirbu | H04L 9/3271 |
| | | | | 713/160 |

(Continued)

FOREIGN PATENT DOCUMENTS

| CN | 101272251 A | 9/2008 |
| CN | 102638794 A | 8/2012 |

(Continued)

OTHER PUBLICATIONS

Search Query Report from IP.com (performed Aug. 26, 2021) (Year: 2021).*

(Continued)

*Primary Examiner* — Sharon S Lynch

(74) *Attorney, Agent, or Firm* — Patterson+ Sheridan, L.L.P.

(57) ABSTRACT

Techniques and apparatus for protecting sequence numbers used in authentication procedures are described. One technique includes receiving, from a network, an authentication request comprising at least a random challenge. After receipt of the authentication request, a synchronization parameter is generated based at least in part on a key shared by the network and the UE, the random challenge, and a first message authentication code (MAC). The synchronization parameter and the first MAC are transmitted to the network in response to the authentication request.

6 Claims, 10 Drawing Sheets

(51) Int. Cl.
   *H04L 9/32* (2006.01)
   *H04W 12/0431* (2021.01)
   *H04W 56/00* (2009.01)
(58) Field of Classification Search
   CPC ... H04L 9/3242; H04L 9/3271; H04L 9/3273; H04W 12/009; H04W 12/041; H04W 12/0431; H04W 12/06; H04W 12/106; H04W 12/122; H04W 56/001
   See application file for complete search history.

(56) References Cited

U.S. PATENT DOCUMENTS

| | | | | |
|---|---|---|---|---|
| 7,472,273 | B2* | 12/2008 | Haverinen | H04W 12/06 713/168 |
| 7,574,599 | B1* | 8/2009 | Zhang | H04L 9/3242 713/168 |
| 7,773,973 | B2* | 8/2010 | Wang | H04L 63/0869 455/411 |
| 8,122,250 | B2* | 2/2012 | Haverinen | H04L 63/0807 713/168 |
| 8,265,593 | B2* | 9/2012 | Patel | H04L 63/0869 455/410 |
| 8,666,368 | B2* | 3/2014 | Schell | H04W 48/18 455/433 |
| 8,792,641 | B2* | 7/2014 | Patel | H04W 12/04 713/169 |
| 9,032,205 | B2* | 5/2015 | Zhang | H04L 9/3242 713/168 |
| 9,326,142 | B2* | 4/2016 | Norrman | H04L 9/3271 |
| 9,338,649 | B2* | 5/2016 | Schell | H04L 63/062 |
| 9,924,357 | B2* | 3/2018 | Lee | H04W 12/06 |
| 10,462,667 | B2* | 10/2019 | Lee | H04W 12/35 |
| 11,159,940 | B2* | 10/2021 | Richard | H04W 12/126 |
| 11,228,429 | B2* | 1/2022 | Arkko | H04L 9/0861 |
| 11,778,460 | B2* | 10/2023 | Johnson | H04W 12/03 713/168 |
| 2003/0200431 | A1* | 10/2003 | Stirbu | H04L 63/0869 713/168 |
| 2003/0200433 | A1* | 10/2003 | Stirbu | H04L 9/0844 713/169 |
| 2004/0078571 | A1* | 4/2004 | Haverinen | H04L 9/3213 713/168 |
| 2005/0135624 | A1* | 6/2005 | Tsai | H04L 63/0869 380/270 |
| 2005/0271209 | A1* | 12/2005 | Sahasrabudhe | H04L 9/0844 380/270 |
| 2007/0005986 | A1* | 1/2007 | Bernard | H04W 12/065 713/185 |
| 2007/0178886 | A1* | 8/2007 | Wang | H04W 56/00 455/411 |
| 2009/0061820 | A1* | 3/2009 | Patel | H04L 63/0869 455/411 |
| 2009/0068985 | A1* | 3/2009 | Nguyen | H04L 9/0844 455/411 |
| 2009/0183003 | A1* | 7/2009 | Haverinen | H04L 9/0869 713/168 |
| 2009/0267730 | A1* | 10/2009 | Zhang | H04L 9/3273 340/5.8 |
| 2010/0011220 | A1* | 1/2010 | Zhao | H04L 9/0844 713/182 |
| 2010/0266107 | A1* | 10/2010 | Brusilovsky | H04W 76/50 379/46 |
| 2011/0269423 | A1* | 11/2011 | Schell | H04L 63/0853 455/411 |
| 2013/0129093 | A1* | 5/2013 | Patel | H04W 12/0431 380/270 |
| 2014/0153722 | A1* | 6/2014 | Mizikovsky | H04W 12/12 380/270 |
| 2014/0162587 | A1* | 6/2014 | Brusilovsky | H04W 12/06 455/404.1 |
| 2014/0248854 | A1* | 9/2014 | Schell | H04L 63/0853 455/411 |
| 2015/0023499 | A1* | 1/2015 | Norrman | H04L 9/0866 380/44 |
| 2015/0087269 | A1* | 3/2015 | Lee | H04W 12/06 455/411 |
| 2016/0309523 | A1* | 10/2016 | Zhang | H04L 69/28 |
| 2018/0014190 | A1* | 1/2018 | Lee | H04B 7/0617 |
| 2019/0246272 | A1* | 8/2019 | Richard | H04W 12/122 |
| 2021/0226781 | A1* | 7/2021 | Arkko | H04L 9/085 |
| 2021/0345116 | A1* | 11/2021 | You | H04W 12/0431 |

FOREIGN PATENT DOCUMENTS

| | | | |
|---|---|---|---|
| CN | 104604181 A | 5/2015 | |
| EP | 1768426 A1 | 3/2007 | |
| WO | 0178306 A1 | 10/2001 | |
| WO | WO-0178306 | * 10/2001 | ............... H04L 9/12 |

OTHER PUBLICATIONS

Search Query Report from IP.com (performed Dec. 14, 2021) (Year: 2021).*
Search Query Report from IP.com (performed Mar. 23, 2022) (Year: 2022).*
Search Query Report from IP.com (performed Sep. 16, 2022) (Year: 2022).*
Search Query Report from IP.com (performed Jan. 25, 2023) (Year: 2023).*
"3rd Generation Partnership Project; Technical Specification Group Services andSystem Aspects; 3G Security; Security architecture (Release 15)",3GPP Standard; Technical Specification, 3GPP TS 33.102, 3rd Generation Partnership Project (3GPP), Mobile Competence Centre, 650, Route Des Lucioles, F-06921, Sophia-Antipolis Cedex, France, vol. SA WG3, No. V15.1.0, Dec. 18, 2018 (Dec. 18, 2018), pp. 1-77, XP051591194, [retrieved on Dec. 18, 2018], the whole document.
International Search Report and Written Opinion—PCT/US2020/014232—ISA/EPO—dated Apr. 24, 2020.
Qualcomm Incorporated: "Adding MACS as an Input Parameter to the Calculation or AK* to Provide Freshness," 3GPP Draft, 3GPP TSG-SA WG3 Meeting #95, S3-191529, 3rd Generation Partnership Project (3GPP), Mobile Competence Centre, 650, Route Des Lucioles, F-06921, Sophia-Antipolis Cedex, France, vol. SA WG3, No. Reno (US); May 6, 2019-May 10, 2019, Apr. 29, 2019 (Apr. 29, 2019), XP051721692, 5 pages, Retrieved from the Internet: URL:http://www.3gpp.org/ftp/tsg%5Fsa/WG3%5FSecurity/TSGS3%5F95%5FReno/Docs/S3%2D191529%2Ezip , [retrieved on Apr. 29, 2019], the whole document.
Qualcomm Incorporated: "Update to the Evaluation of Solution #4.1 on Protecting SQN in AKA Re-synchronisations", 3GPP Draft, 3GPP TSG SA WG3 (Security) Meeting #97, 53-194681, 3rd Generation Partnership Project (3GPP), Mobile Competence Centre, 650, Route Des Lucioles, F-06921, Sophia-Antipolis Cedex, France, vol. SA WG3, No. Reno (US); Nov. 18, 2019-Nov. 22, 2019, Nov. 22, 2019 (Nov. 22, 2019), XP051828790, 2 pages, Retrieved from the Internet: URL: https://ftp.3gpp.org/Meetings_3GPP_SYNC/SA3/Docs/S3-194681.zip S3-194681.doc [retrieved on Nov. 22, 2019], the whole document.
Qualcomm Incorporated: "Using MACS to Provide Freshness for tne Protection of SQN During a Re-synchronisation Procedure in AKA", 3GPP Draft, 3GPP TSG-SA WG3 Meeting #96 Ad-Hoc,S3-193812, 3rd Generation Partnership Project (3GPP), Mobile Competence Centre, 650, Route Des Lucioles, F-06921, Sophia-Antipolis Cedex, France, vol. SA WG3, No. Chongqing, China; Oct. 14, 2019-Oct. 18, 2019, Oct. 21, 2019 (Oct. 21, 2019), XP051799340, 2 pages, Retrieved from the Internet: URL: https://ftp.3gpp.org/tsg_sa/WG3_Security/TSGS3_96AH_Chongqing/Docs/S3-193812.zip 53-193812.doc, [retrieved on Oct. 21, 2019], th.
Siemens AG: "Authentication and Key Agreement", 3GPP Draft, TSG SA WG3 #9, Helsinki, S3-99540-CR-33102320-SECTION 6.3, 3rd Generation Partnership Project (3GPP), Mobile Competence Centre, 650, Route Des Lucioles, F-06921, Sophia-Antipolis Cedex, France, vol. SA WG3, No. Helsinki; Dec. 7- 9, 1999, Nov. 7, 2014 (Nov. 7, 2014), XP051682058, 9 pages, Retrieved from the

(56) References Cited

OTHER PUBLICATIONS

Internet.URL: http://www.3gpp.org/ftp/tsg%5Fsa/WG3%5FSecurity/TSGS3%5F09/Docs/S3%2D99540%2DCR%2D33102320%2DSection%206%2E3%2Ezip [retrieved on Nov. 7, 2014] the whole document.

* cited by examiner

PROTECTION OF SEQUENCE NUMBERS IN AUTHENTICATION AND KEY AGREEMENT PROTOCOL

CROSS-REFERENCE TO RELATED APPLICATION

This application claims the benefit of and priority to U.S. Provisional Patent Application Ser. No. 62/794,191, filed Jan. 18, 2019, which is assigned to the assignee hereof and hereby expressly incorporated by reference herein.

BACKGROUND

Field of the Disclosure

Aspects of the present disclosure relate to wireless communications, and more particularly, to techniques for protecting sequence numbers (SQNs) used in authentication protocols, e.g., authentication and key agreement (AKA) protocols.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between base stations and user equipment in a wireless network.

Certain aspects provide a method for wireless communication by a user equipment. The method generally includes receiving, from a network, an authentication request comprising at least a random challenge. The method also includes, after receiving the authentication request, generating a synchronization parameter based at least in part on a key shared by the network and the UE, the random challenge, and a first message authentication code (MAC). The method further includes transmitting, in response to the authentication request, the synchronization parameter and the first MAC to the network.

Certain aspects provide an apparatus for wireless communication. The apparatus generally includes a receiver, at least one processor, a transmitter, and a memory coupled to the at least one processor. The receiver is configured to receive, from a network, an authentication request comprising at least a random challenge. The at least one processor is configured to generate, after the authentication request has been received, a synchronization parameter based at least in part on a key shared by the network and the apparatus, the random challenge, and a first message authentication code (MAC). The transmitter is configured to transmit, in response to the authentication request, the synchronization parameter and the first MAC to the network.

Certain aspects provide an apparatus for wireless communication. The apparatus generally includes means for receiving, from a network, an authentication request comprising at least a random challenge. The apparatus also includes means for generating, after receiving the authentication request, a synchronization parameter based at least in part on a key shared by the network and the UE, the random challenge, and a first message authentication code (MAC). The apparatus further includes means for transmitting, in response to the authentication request, the synchronization parameter and the first MAC to the network.

Certain aspects provide a computer-readable medium for wireless communication by a user equipment (UE). The computer-readable has computer executable code stored thereon that, when executed by one or more processors, performs an operation. The operation includes receiving, from a network, an authentication request comprising at least a random challenge. The operation also includes, after receiving the authentication request, generating a synchronization parameter based at least in part on a key shared by the network and the UE, the random challenge, and a first message authentication code (MAC). The operation further includes transmitting, in response to the authentication request, the synchronization parameter and the first MAC to the network.

Certain aspects provide a method for wireless communication by a network entity. The method generally includes transmitting, to a user equipment (UE), an authentication request comprising at least a random challenge. The method also includes, after transmitting the authentication request, receiving a synchronization parameter and a first message authentication code (MAC). The method further includes deriving a first sequence number from the synchronization parameter using at least a key shared with the UE and the network entity, the random challenge, and the first MAC.

Certain aspects provide an apparatus for wireless communication. The apparatus generally includes a transmitter, a receiver, at least one processor, and a memory coupled to the at least one processor. The transmitter is configured to transmit, to a user equipment (UE), a first authentication request comprising at least a random challenge. The receiver is configured to receive, after transmission of the first authentication request, a synchronization parameter and a first message authentication code (MAC). The at least one processor is configured to derive a first sequence number from the synchronization parameter using at least a key shared with the UE and the apparatus, the random challenge, and the first MAC.

Certain aspects provide an apparatus for wireless communication. The apparatus generally includes means for transmitting, to a user equipment (UE), an authentication request comprising at least a random challenge. The apparatus also includes means for receiving, after transmitting the authentication request, a synchronization parameter and a first message authentication code (MAC). The apparatus further includes means for deriving a first sequence number from the synchronization parameter using at least a key shared with the UE and the network entity, the random challenge, and the first MAC.

Certain aspects provide a computer-readable medium for wireless communication by a network entity. The computer-readable has computer executable code stored thereon that, when executed by one or more processors, performs an operation. The operation includes transmitting, to a user equipment (UE), an authentication request comprising at least a random challenge. The operation also includes, after transmitting the authentication request, receiving a synchronization parameter and a first message authentication code (MAC). The operation further includes deriving a first sequence number from the synchronization parameter using at least a key shared with the UE and the network entity, the random challenge, and the first MAC.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
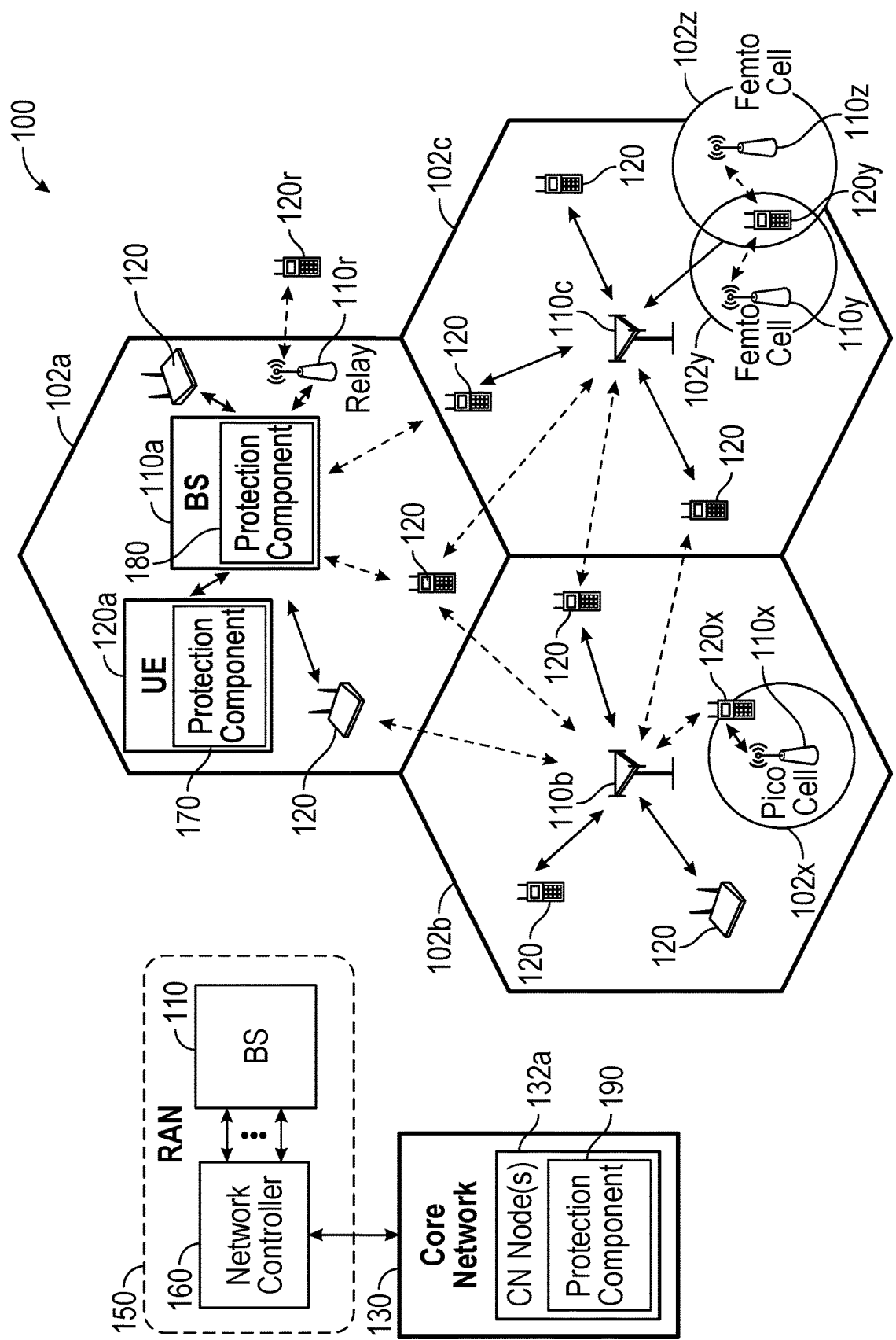
FIG. 1 is a block diagram conceptually illustrating an example telecommunications system, in accordance with certain aspects of the present disclosure.

Aspects of the present disclosure provide apparatus, methods, processing systems, and computer readable mediums for improving protection of sequence numbers (SQNs) in authentication procedures (e.g., authentication and key agreement (AKA) protocols) for secure wireless communications. For example, conventional authentication procedures, such as AKA protocol, may be susceptible to certain replay attacks that allow a malicious actor to uncover the value of the SQN used in the authentication procedure. As described in more detail below, the SQN can be compromised due in part to the use of exclusive-or operations and a lack of randomness used in the conventional protection mechanism of the SQN.

To address this, aspects presented herein provide improved techniques for protecting SQN(s) in authentication protocols (e.g., AKA protocols). As described in more detail below, aspects provide techniques for incorporating the message authentication code (MAC) that integrity protects the SQN into the calculation of the keystream for protecting SQN. By doing so, the keystream becomes different for each SQN, such that it is not possible to find the XOR between two different SQNs.

The following description provides examples of protecting SQNs in authentication protocols used for secure wireless communications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

FIG. 1 illustrates an example wireless communication network 100 in which aspects of the present disclosure may be performed. For example, the wireless communication network 100 may be an NR system (e.g., a 5G NR network), a LTE system, system that supports both NR and LTE, etc.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A RAN 150 may include a network controller 160 and the BS(s) 110. The RAN 150 may be in communication with a CN 130, which includes one or more CN nodes 132a. The network controller 160 may couple to a set of BSs 110 and provide coordination and control for these BSs 110. The network controller 160 may communicate with the BSs 110 via a backhaul. The BSs 110 may also communicate with one another (e.g., directly or indirectly) via wireless or wireline backhaul. Although a single RAN 150 and a single CN 130 are depicted in FIG. 1, the wireless communication network 100 may include multiple RANs 150 and/or multiple CNs 130. Further, in some cases, the wireless communication network 100 may support RANs/CNs of same RATs, different RATs, or a combination of RATs.

As illustrated, UE 120a includes a protection component 170, which is configured to implement one or more techniques described herein for protecting sequence numbers in authentication protocols. Using the protection component 170, the UE 120a may receive, from a network (e.g., CN 130), an authentication request comprising at least a random challenge, and generate a synchronization parameter based at least in part on a key shared by the network and the UE, the random challenge, and a first MAC. The UE 120a may transmit, in response to the authentication request, the synchronization parameter and the first MAC to the network.

As also illustrated, BS 110a (e.g., RAN entity or RAN node, such as a gNB or eNB) includes a protection component 180, which is configured to implement one or more techniques described herein for protecting sequence numbers in authentication protocols. As further illustrated, CN node 132a includes a protection component 190, which is configured to implement one or more techniques described herein for protection sequence numbers in authentication protocols. Using the protection component 190, the CN node 132a may transmit, to the UE (e.g., UE 120a), a first authentication request comprising at least a random challenge and, after transmitting the first authentication request, receive a synchronization parameter and a first MAC. The CN node 132a, using the protection component 190, may derive a first sequence number from the synchronization parameter using at least a key shared with the UE and the network entity, the random challenge, and the first MAC.

Figure 2:
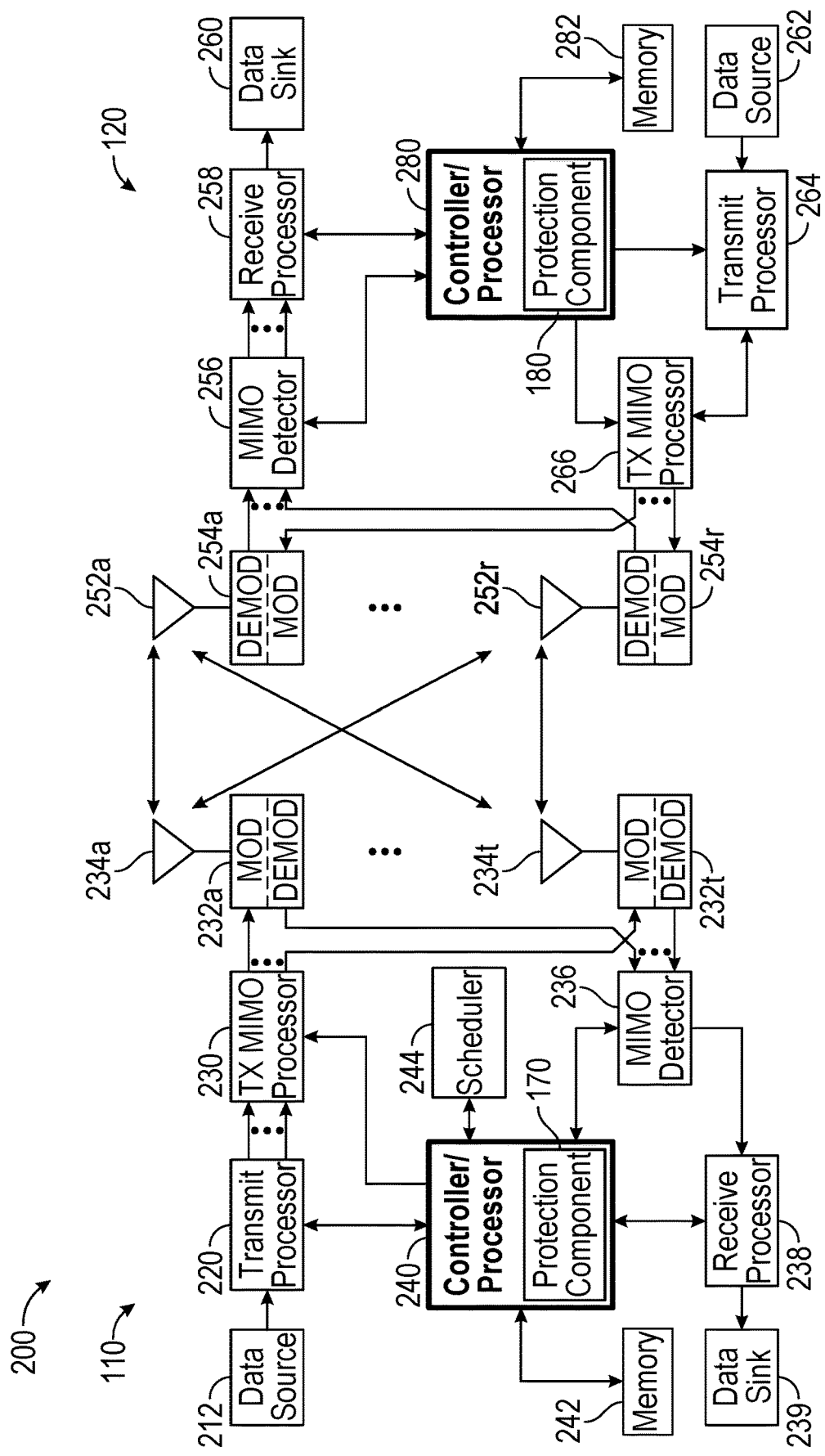
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, as shown in FIG. 2, the controller/processor 280 of the UE 120*a* has a protection component 170, which is configured to implement one or more techniques described herein for protecting sequence numbers in authentication protocols, according to aspects described herein. Similarly, the controller/processor 240 and/or other processors and modules at the BS 110*a* may perform or direct the execution of processes for the techniques described herein. For example, as shown in FIG. 2, the controller/processor 240 of the BS 110*a* has a protection component 180, which is configured to implement one or more techniques described herein for protecting sequence numbers in authentication protocols, according to aspects described herein. Further, although not shown in FIG. 2, a CN node may include a controller/processor and/or other processors and modules that perform or direct the execution of processes for the techniques described herein. For example, the controller/processor of the CN node may include a protection component 190, which is configured to implement one or more techniques described herein for protecting sequence numbers used in authentication protocols, according to aspects described herein. Although shown at the Controller/Processor, other components of the UE 120*a* and BS 110*a* may be used performing the operations described herein.

Figure 3:
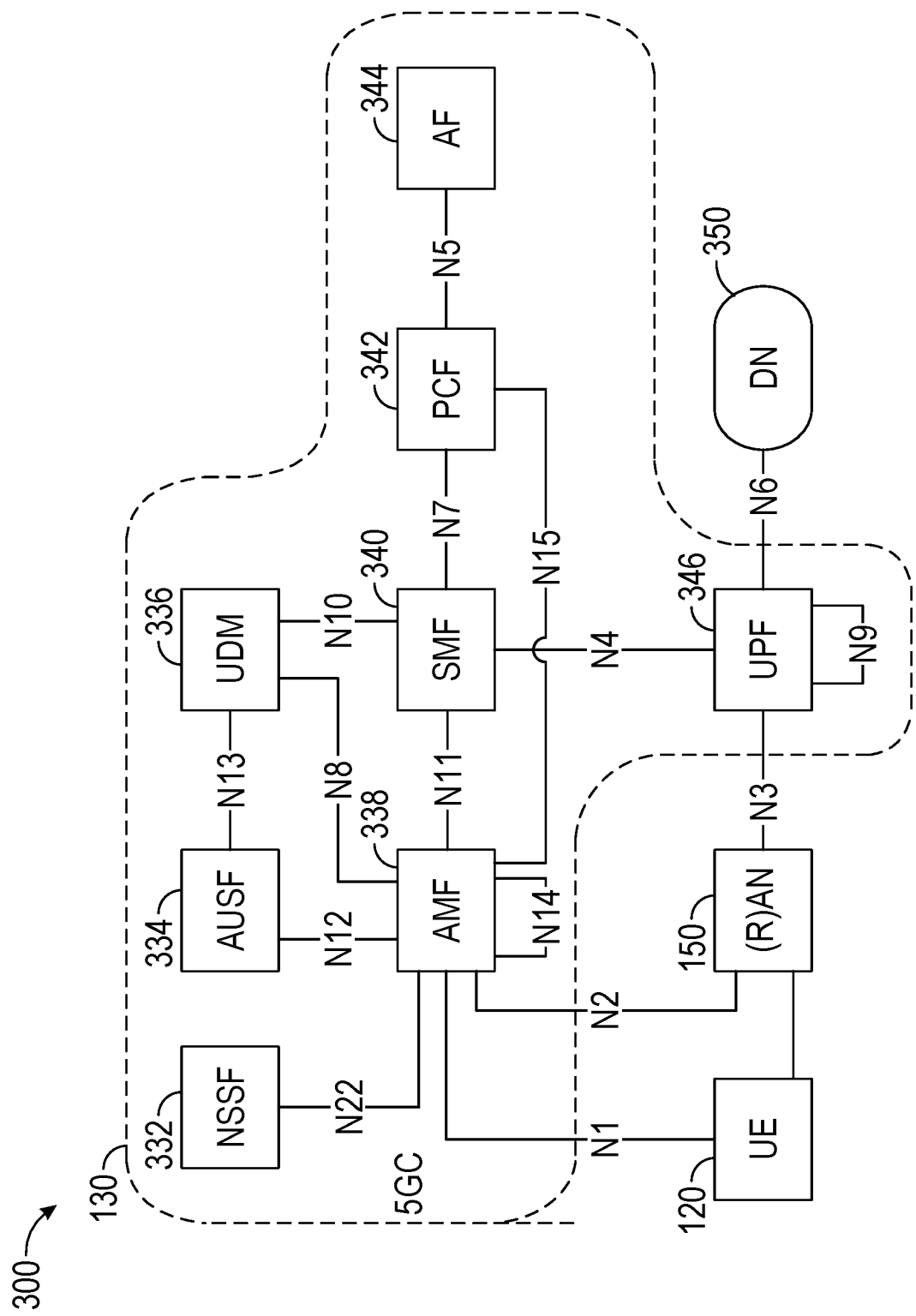
FIG. 3 is a diagram illustrating an example 5G system architecture, in accordance with certain aspects of the present disclosure.

FIG. 3 is a diagram illustrating an example 5G system architecture, according to aspects of the present disclosure. As shown, the 5G system 300 includes a RAN 150, a UE 120, a core network (CN) 130, and a data network (DN) 350 (e.g. operator services, Internet access or third party services). The CN 130 may be implemented by one or more network entities (e.g., CN node(s) 132*a*) that perform the following network functions (NF): Network Slice Selection Function (NSSF) 332; Authentication Server Function (AUSF) 334; Unified Data Management (UDM) 336; Access and Mobility Management Function (AMF) 338; Session Management Function (SMF) 340; Policy Control Function (PCF) 342; Application Function (AF) 344; User Plane Function (UPF) 346; and various other functions such as Unstructured Data Storage Function (UDSF); Network Exposure Function (NEF); NF Repository Function (NRF); Unified Data Repository (UDR); 5G-Equipment Identity Register (5G-EIR); Security Edge Protection Proxy (SEPP).

The AMF 338 includes the following functionality (some or all of the AMF functionalities may be supported in one or more instances of an AMF): Termination of RAN CP interface (N2); Termination of NAS (N1), NAS ciphering and integrity protection; Registration management; Connection management; Reachability management; Mobility Management; Lawful intercept (for AMF events and interface to LI System); Provide transport for SM messages between UE and SMF; Transparent proxy for routing SM messages; Access Authentication; Access Authorization; Provide transport for SMS messages between UE and SMSF; Security Anchor Functionality (SEAF); Security Context Management (SCM), which receives a key from the SEAF that it uses to derive access-network specific keys; Location Services management for regulatory services; Provide transport for Location Services messages between UE and LMF as well as between RAN and LMF; EPS Bearer ID allocation for interworking with EPS; and UE mobility event notification.

In certain aspects, the AMF may interact with the AUSF and the UE, receives the intermediate key that was established as a result of the UE authentication process. In the case of Universal Subscriber Identity Module (USIM) based authentication, the AMF retrieves the security material from the AUSF.

Regardless of the number of Network functions, there may be only one NAS interface instance per access network between the UE and the CN, terminated at one of the Network functions that implements at least NAS security and Mobility Management.

In addition to the functionalities of the AMF described above, the AMF may include the following functionality to support non-3GPP access networks: Support of N2 interface with N3IWF; Support of NAS signaling with a UE over N3IWF; Support of authentication of UEs connected over N3IWF; Management of mobility, authentication, and separate security context state(s) of a UE connected via non-3GPP access or connected via 3GPP and non-3GPP accesses simultaneously; Support a co-ordinated RM management context valid over 3GPP and Non 3GPP accesses; and Support dedicated CM management contexts for the UE for connectivity over non-3GPP access.

Not all of the functionalities are required to be supported in an instance of a Network Slice. In addition to the functionalities of the AMF described above, the AMF may include policy related functionalities as further described herein. Over the N2 interface, some information (e.g. 3GPP Cell Identification) and procedures (e.g. Handover related) defined over 3GPP access may not apply, and non-3GPP access specific information may be applied that do not apply to 3GPP accesses. Some procedures supported by NAS signaling over 3GPP access may be not applicable to untrusted non-3GPP (e.g. Paging) access.

The SMF 340 includes the following functionality (some or all of the SMF functionalities may be supported in one or more instances of an SMF): Session Management e.g. Session Establishment, modify and release, including tunnel maintain between UPF and AN node; UE IP address allocation & management (including optional Authorization); DHCPv4 (server and client) and DHCPv6 (server and client) functions; ARP proxying as specified in IETF RFC 1027 and/or IPv6 Neighbour Solicitation Proxying as specified in IETF RFC 4861 functionality for the Ethernet packet data units (PDUs) (The SMF responds to the ARP and/or the IPv6 Neighbour Solicitation Request by providing the MAC address corresponding to the IP address sent in the request.); Selection and control of UP function, including controlling the UPF to proxy ARP or IPv6 Neighbour Discovery, or to forward all ARP/IPv6 Neighbour Solicitation traffic to the SMF, for Ethernet PDU Sessions; Configures traffic steering at UPF to route traffic to proper destination; Termination of interfaces towards Policy control functions; Lawful intercept (for SM events and interface to LI System); Charging data collection and support of charging interfaces; Control and coordination of charging data collection at UPF; Termination of SM parts of NAS messages; Downlink Data Notification; Initiator of AN specific SM information, sent via AMF over N2 to AN; Determine SSC mode of a session; and Roaming functionality such as handle local enforcement to apply QoS SLAB (VPLMN), charging data collection and charging interface (VPLMN), lawful intercept (in VPLMN for SM events and interface to LI System), and support for interaction with external DN for transport of signaling for PDU Session authorization/authentication by external DN.

Not all of the functionalities are required to be supported in a instance of a Network Slice. In addition to the functionalities of the SMF described above, the SMF may include policy related functionalities as further described herein.

The UPF 346 includes the following functionality (some or all of the UPF functionalities may be supported in a single instance of a UPF): Anchor point for Intra-/Inter-RAT mobility (when applicable); External PDU Session point of interconnect to Data Network; Packet routing & forwarding (e.g. support of Uplink classifier to route traffic flows to an instance of a data network, support of Branching point to support multi-homed PDU Session); Packet inspection (e.g. Application detection based on service data flow template and the optional PFDs received from the SMF in addition); User Plane part of policy rule enforcement, e.g. Gating, Redirection, Traffic steering); Lawful intercept (UP collection); Traffic usage reporting; QoS handling for user plane, e.g. UL/DL rate enforcement or reflective QoS marking in DL; Uplink Traffic verification (SDF to QoS Flow mapping); Transport level packet marking in the uplink and downlink; Downlink packet buffering and downlink data notification triggering; Sending and forwarding of one or more "end marker" to the source NG-RAN node; and ARP proxying as specified in IETF RFC 1027 and/or IPv6 Neighbour Solicitation Proxying as specified in IETF RFC 4861 functionality for the Ethernet PDUs. The UPF responds to the ARP and/or the IPv6 Neighbour Solicitation Request by providing the MAC address corresponding to the IP address sent in the request. Not all of the UPF functionalities are required to be supported in an instance of user plane function of a Network Slice.

The UDM includes support for the following functionality: Generation of 3GPP AKA Authentication Credentials; User Identification Handling (e.g. storage and management of SUPI for each subscriber in the 5G system); Access authorization based on subscription data (e.g. roaming restrictions); UE's Serving NF Registration Management (e.g. storing serving AMF for UE, storing serving SMF for UE's PDU Session); Support to service/session continuity e.g. by keeping SMF/DNN assignment of ongoing sessions; MT-SMS delivery support; Lawful Intercept Functionality (especially in outbound roaming case where UDM is the only point of contact for LI); Subscription management; SMS management;

To provide this functionality, the UDM uses subscription data (including authentication data) that may be stored in UDR, in which case a UDM implements the application logic and does not require an internal user data storage and then several different UDMs may serve the same user in different transactions.

The interaction between UDM and HSS is implementation specific. The UDM is located in the HPLMN of the subscribers it serves, and access the information of the UDR located in the same PLMN.

The UDR supports the following functionality: Storage and retrieval of subscription data by the UDM; Storage and retrieval of policy data by the PCF; Storage and retrieval of structured data for exposure, and application data (including Packet Flow Descriptions (PFDs) for application detection, application request information for multiple UEs), by the NEF. The UDR is located in the same PLMN as the NF service consumers storing in and retrieving data from it using Nudr, which is an intra-PLMN interface.

Figure 4:
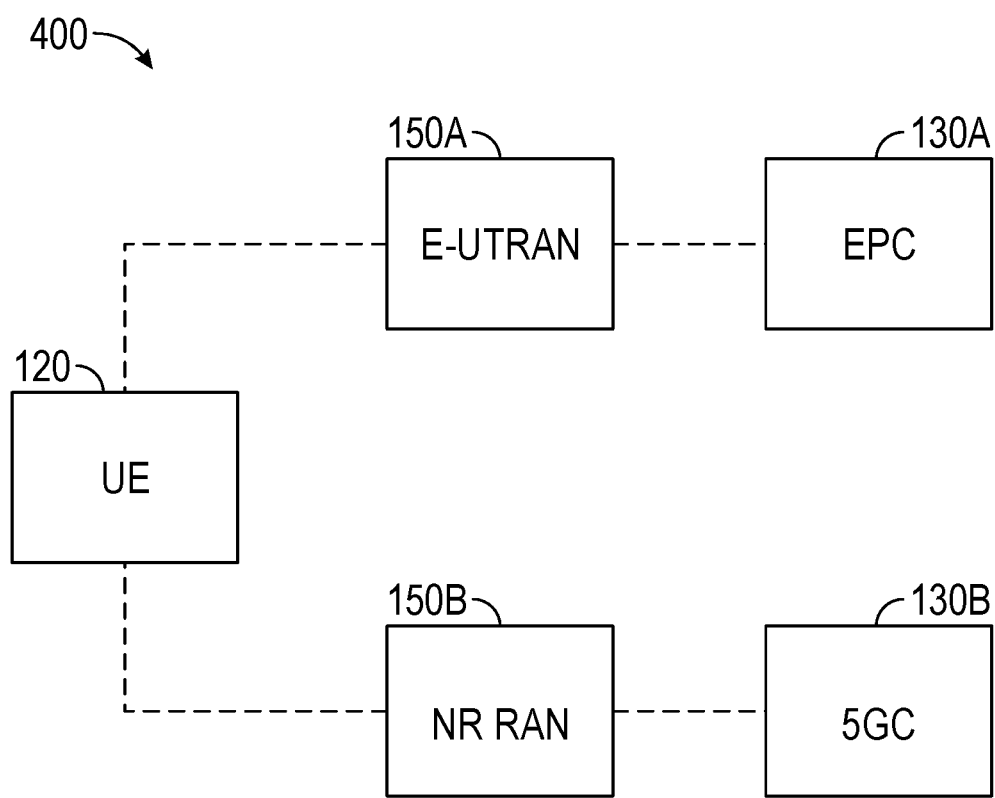
FIG. 4 illustrates an example system architecture for interworking between a 5G System (5GS) and an E-UTRAN system, in accordance with certain aspects of the present disclosure.

FIG. 4 illustrates an example system architecture 400 for interworking between two systems/networks (e.g., 5GS and E-UTRAN-EPC), in accordance with certain aspects of the present disclosure. As shown, the UE 120 may be served by separate RANs 150A (e.g., E-UTRAN) and 150B (e.g., NR RAN0 controlled by separate core networks 130A (e.g., EPC) and 130B (e.g., 5GC), where RAN 150A provides E-UTRA services and RAN 150B provides NR services. The UE may operate under only one RAN/CN or both RANs/CNs at a time.

Authentication protocols are generally used as part of the process to protect network communications (e.g., between UEs and the network). The AKA protocol is one example of an authentication protocol that is generally used for mutually authenticating a UE (e.g., equipped with a USIM) with networks and establishing keys to protect subsequent communications. The AKA protocol achieves mutual authentication by the UE and the network showing (or demonstrating) knowledge of a secret key (K) (e.g., $K_{IMSI}$) which is shared between and available to the UE and the authentication center (AuC) in the UE's home network (e.g., home location register (HLR)). In addition, the AKA protocol uses multiple counters $SQN_{MS}$ and $SQN_{HE}$ to provide replay protection for the UE. $SQN_{HE}$ is an individual counter for each user that is stored in the home network and $SQN_{MS}$ is an individual counter stored at the UE and represents the highest SQN the UE has accepted.

The AKA protocol generally includes three phases: (1) identification, (2) challenge-response, and (3) re-synchronization procedure. In the identification phase, the serving network (e.g., visitor location register (VLR)/serving GPRS support node (SGSN)) identifies the UE. If the current UE's identity is unknown to the serving network, the serving network may request the UE's identity (International Mobile Subscriber Identity (IMSI)) from the UE via a "user identity request" message. The UE, in response, may send its IMSI to the serving network in a "user identity response" message. The UE identity enables the serving network to request authentication material from the home network (e.g., HLR/AuC).

Figure 5:
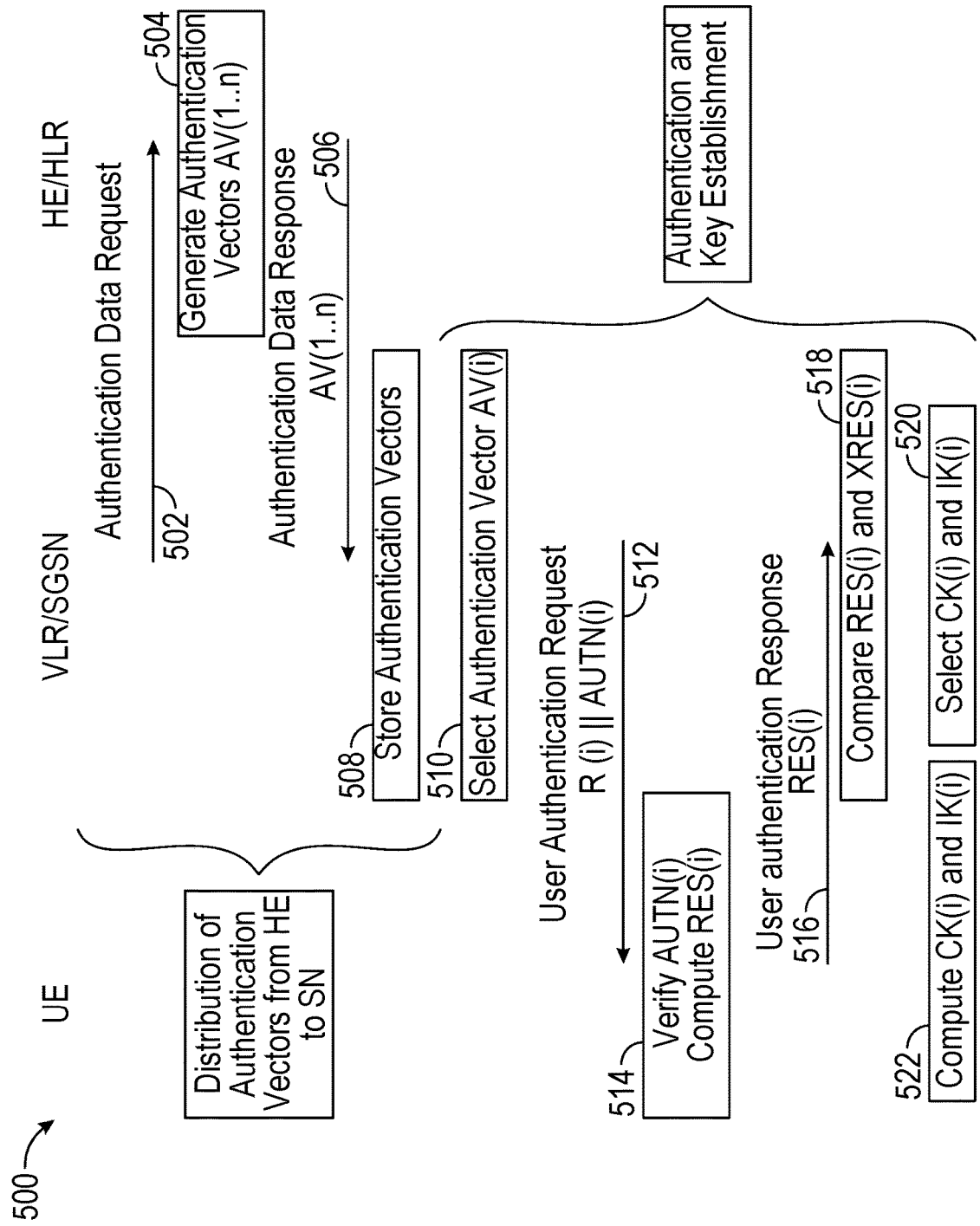
FIG. 5 illustrates an example flow of the AKA protocol challenge-response phase.

In the challenge-response phase, the home network generates authentication material (e.g., one or more authentication vectors) in response to receiving a request for authentication of the UE from the serving network, and sends the authentication material to the serving network. Subsequently, the serving network and the UE may exchange authentication request/response messages, based on the authentication material. FIG. 5 depicts one example flow 500 of the AKA protocol challenge-response phase.

As shown, upon receipt of a request from the VLR/SGSN (502), the HE/AuC generates (504) and sends an ordered array of n authentication vectors to the VLR/SGSN (506). The authentication vectors may be ordered based on sequence number. Each authentication vector includes a random challenge (e.g., random number (R)), an expected response XRES, a cipher key (CK), an integrity key (IK), and an authentication token (AUTN). Each authentication vector may be used (or is valid) for one authentication and key agreement between the VLR/SGSN and the UE. The authentication vectors may be stored at the VLR/SGSN (508).

When the VLR/SGSN initiates an authentication and key agreement, it selects the next authentication vector from the ordered array (510) and sends the parameters R and AUTN to the UE (512). AUTN may be generated according to the following:

$$\text{AUTN} = (\text{Hidden})\text{Sequence Number}(\text{SQN}) \| \text{AMF} \| \text{MAC} \quad (1),$$

where AMF is an authentication management field used to signal information (parameters) on authentication to the UE, and MAC is generated using the long term subscriber key (K) (e.g., $K_{IMSI}$) with R, AMF and SQN (e.g., $SQN_{HE}$) as inputs. In one example, the MAC in (1) may be generated according to the following:

$$\text{MAC} = f1_K(\text{SQN} \| R \| \text{AMF}) \quad (2),$$

where f1 is a message authentication function. Note that, as used herein, ∥ represents a concatenation. The $SQN_{HE}$ in AUTN may be hidden (or concealed) with an anonymity key (AK) (e.g., $SQN_{HE} \oplus AK$, where $\oplus$ is the "exclusive or"). In one example, AK may be generated according to the following:

$$\text{AK} = f5_K(R) \quad (3),$$

where f5 is a key generating function.

The UE checks whether AUTN can be accepted (514) and, if so, generates a response (RES) (514), which is sent back to the VLR/SGSN (516). The UE also generates CK and IK (522). The VLR/SGSN compares the received RES with XRES (518) and, if they match, considers the authentication and key agreement exchange to be successfully completed. The established keys CK and IK are then transferred by the UE and the VLR/SGSN to the entities that perform ciphering and integrity functions (520).

Figure 6:
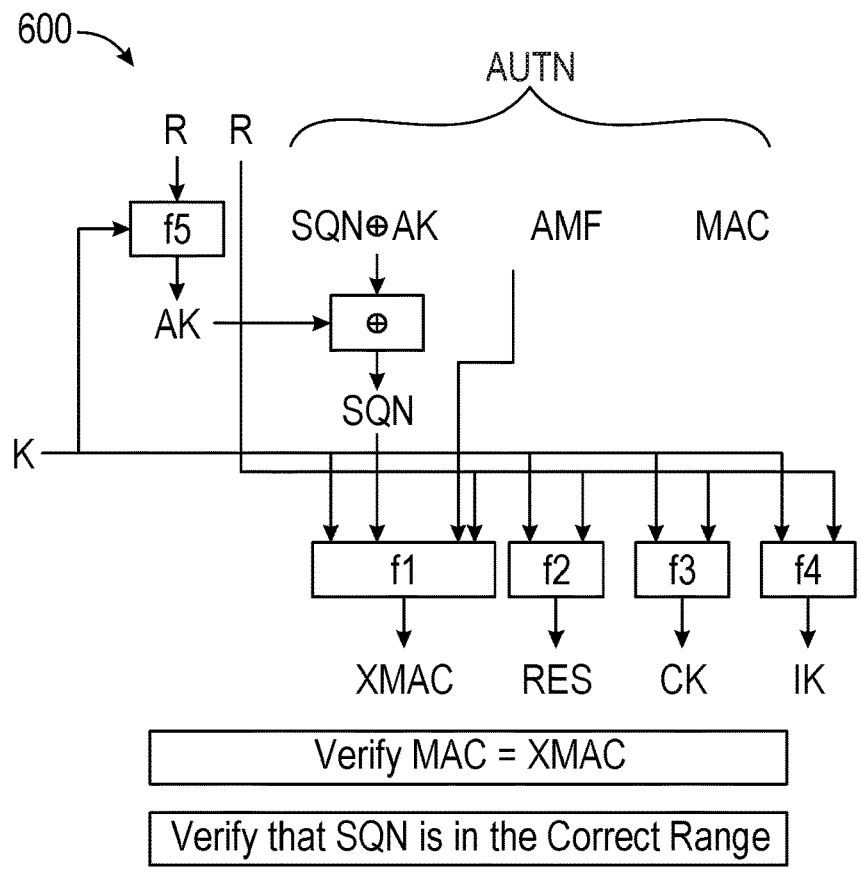
FIG. 6 illustrates an example procedure for determining whether authentication is successful.

To determine whether authentication is successful, the UE checks (1) whether the message authentication code (MAC) extracted from AUTN is correct and (2) verifies the freshness of the authentication vector that is used for the user authentication request (e.g., in order to defend against replay attacks). FIG. 6 depicts one example procedure 600 the UE may use to determine whether authentication is successful.

As shown, upon receiving R and AUTN, the UE computes (or generates) the AK (e.g., using (3)) and retrieves the sequence number $SQN_{HE} = (SQN_{HE} \oplus AK) \oplus AK$. The UE generates the expected MAC (XMAC) (e.g., $\text{XMAC} = f1_K(SQN_{HE} \| R \| \text{AMF})$), using the R and extracted $SQN_{HE}$ from AUTN. The UE determines whether XMAC=MAC included in AUTN, and whether the retrieved $SQN_{HE}$ is fresh (e.g., $SQN_{HE}$ is in a predetermined range of SQN values). If XMAC is not equal to MAC, the UE sends an authentication failure message back to the VLR/SGSN and may abandon the authentication procedure. If XMAC=MAC and the retrieved $SQN_{HE}$ is not fresh (e.g., the $SQN_{HE}$ is not in the correct range), the UE determines there has been a synchronization failure. In this case, the UE sends an indication of the synchronization failure back to the VLR/SGSN including a synchronization parameter (AUTS). The AUTS is used to allow the home network to re-synchronize with the UE by replacing its own $SQN_{HE}$ by another SQN based on the $SQN_{MS}$ of the UE (e.g., $SQN_{MS}$+threshold). If XMAC=MAC and the $SQN_{HE}$ is fresh, the UE may proceed to generate RES (e.g., $\text{RES} = f2_K(R)$), CK (e.g., $\text{CK} = f3_K(R)$), and IK (e.g., $\text{IK} = f4_K(R)$), where f2 is a message authentication function, f3 is a key generating function, and f4 is a key generating function. In one example, the UE may determine the $SQN_{HE}$ is fresh if $SQN_{HE} > SQN_{MS}$ and $SQN_{HE} < SQN_{MS}$+threshold.

Figure 7:
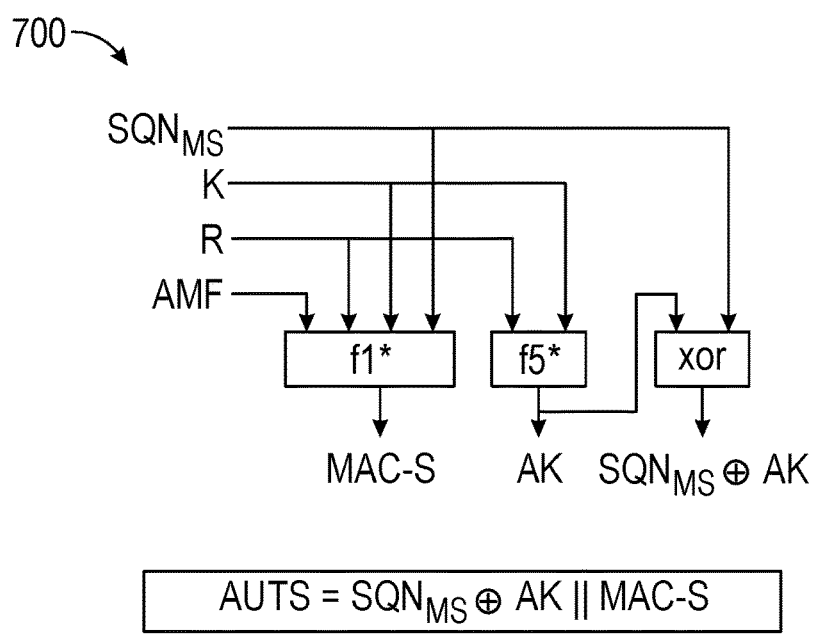
FIG. 7 illustrates an example procedure for generating a synchronization parameter.

In the re-synchronization phase (e.g., the UE determines $SQN_{HE}$ is not fresh), the UE generates the synchronization parameter AUTS in order to allow the network to re-synchronize with the UE. FIG. 7 depicts one example procedure 700 that can be used to generate AUTS.

As shown, the UE has knowledge of the SQN (that the UE will accept) (e.g., $SQN_{MS}$) and calculates the synchronization MAC (e.g., MAC-S) using K (e.g., $K_{IMSI}$) with R, $SQN_{MS}$ and AMF as inputs. In particular, the MAC-S may be generated using the following:

$$\text{MAC-S} = f1^*_K(SQN_{MS} \| R \| \text{AMF}) \quad (4),$$

where f1* is message authentication code function with the property that no valuable information can be inferred from the function values of f1* about those of f1, . . . , f5, f5* and vice versa. With MAC-S, the UE then calculates AUTS according to the following:

$$\text{AUTS} = \text{SQN}_{MS} \oplus \text{AK}^* \| \text{MAC-S} \tag{5}$$

where $\text{AK}^* = f5^*_K(R)$, and f5* is a key generating function used to compute AK* in re-synchronization and has the property that no valuable information can be inferred from the function values of f5* about those of f1, f1*, f2, f2*, . . . , f5 and vice versa.

After resetting $\text{SQN}_{HE}$ with $\text{SQN}_{MS}$ extracted from the AUTS, the network may generate another set of authentication vectors based on the reset $\text{SQN}_{HE}$, and send the authentication vectors to the VLR/SGSN to attempt re-synchronization with the UE.

Example Protection of SQN in AKA Protocol

One issue with the AKA protocol discussed above is that the AKA protocol may be susceptible to certain replay attacks that allow malicious actors to uncover the value of SQN. In particular, the protection mechanism of the SQN (e.g., concealing SQN with AK) (e.g., illustrated in FIG. 7) can be defeated under specific replay attacks due to its use of exclusive-or (XOR) and a lack of randomness. In such an attack, for example, a malicious actor can repeatedly send the same authentication challenge (R, AUTN) to the UE and retrieve multiple AUTS from the UE in response. Because the $\text{SQN}_{MS}$ returned at synchronization failure (e.g., in AUTS) is protected with XOR with $f5^*_K(R)$, the malicious actor can infer (e.g., uncover) at least a portion of the $\text{SQN}_{MS}$ (e.g., one or more bits of the $\text{SQN}_{MS}$) by comparing the multiple AUTS returned from the UE. For a given R, the XOR difference between two $\text{SQN}_{SMS}$ is preserved, such that the $\text{SQN}_{MS}$ can be uncovered by XOR'ing away the AK* used to conceal $\text{SQN}_{MS}$.

Accordingly, aspects presented herein provide improved techniques for protecting SQN in authentication protocols (e.g., AKA protocols). Particularly, aspects provide techniques for incorporating the MAC (e.g., MAC-S) that integrity protects the SQN (e.g., $\text{SQN}_{MS}$) into the calculation of the keystream (e.g., AK*) for protecting SQN. By doing so, the keystream becomes different for each $\text{SQN}_{MS}$, such that it is not possible to find the XOR between two different $\text{SQN}_{SMS}$.

Note that while many of the aspects described herein use the AKA protocol for UMTS as a reference example of an authentication protocol in which SQNs can be protected using the techniques described herein, the techniques described herein are not limited to the AKA protocol for UMTS. Those of ordinary skill in the art will understand that the techniques for protecting SQNs can be applied to other authentication protocols. For example, aspects presented herein can be used for AKA protocols for 4G (LTE), AKA protocols for 5G, AKA used in IMS, etc.

Figure 8:
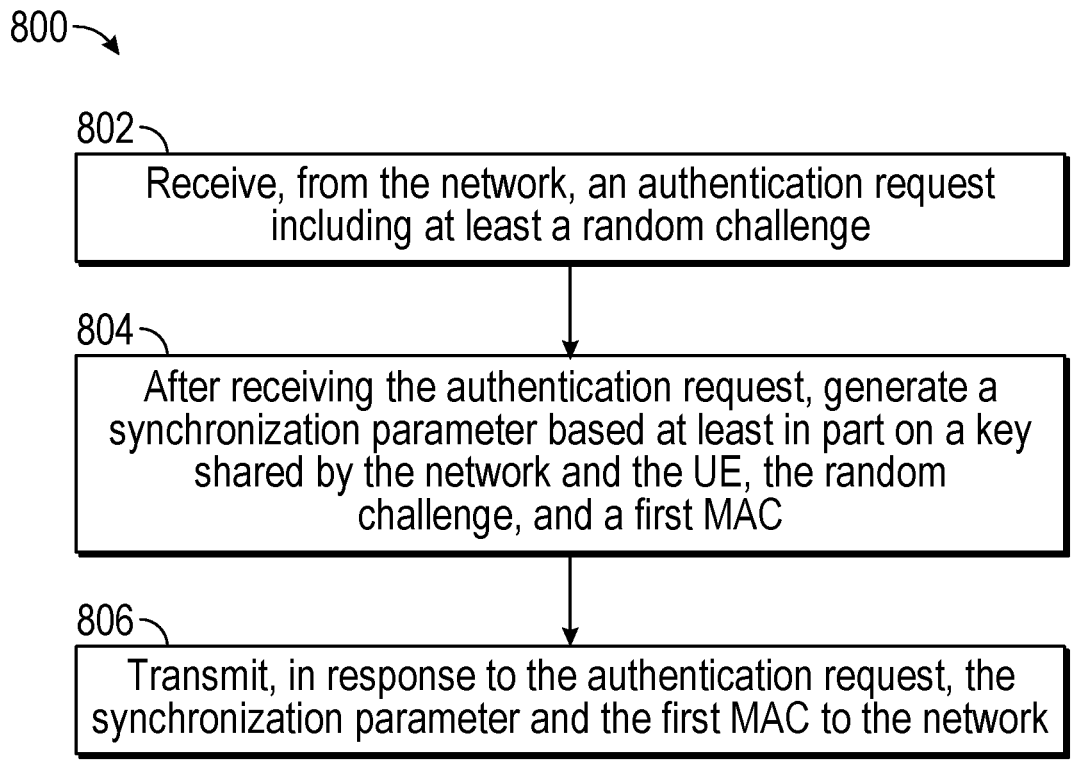
FIG. 8 is a flow diagram illustrating example operations for wireless communications, in accordance with certain aspects of the present disclosure.

FIG. 8 illustrates example operations 800 for wireless communications, according to certain aspects of the present disclosure. The operations 800 may be performed, for example, by a UE for authenticating a network for subsequent communications with the network. Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 may begin at 802, where the UE receives, from the network (e.g., CN 130), an authentication request (e.g., user authentication request) that includes at least a random challenge (e.g., R). At 804, the UE generates a synchronization parameter (e.g., AUTS) based at least in part on a key (e.g., $K_{IMSI}$) shared by the network and the UE, the random challenge, and a first MAC (e.g., MAC-S), after receiving the authentication request. At 806, the UE transmits, in response to the authentication request, the synchronization parameter and the first MAC to the network.

Figure 9:
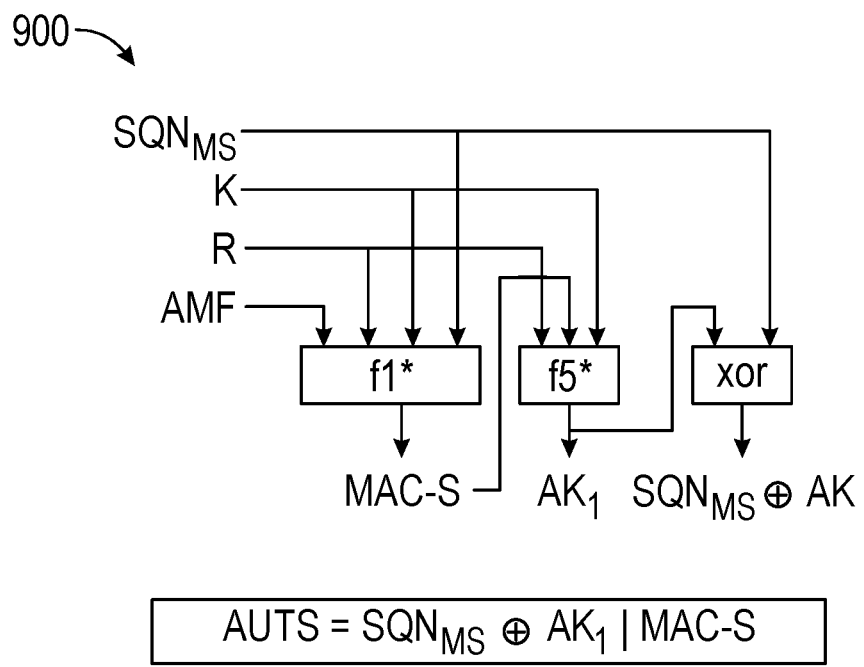
FIG. 9 illustrates an example improved procedure for generating a synchronization parameter, in accordance with certain aspects of the present disclosure.

FIG. 9 illustrates an example improved procedure 900 (e.g., relative to the procedure in FIG. 7) that can be used to generate AUTS, according to certain aspects of the present disclosure. As shown, compared to AK* in FIG. 7, the $AK_1$ in FIG. 9 is generated with K (e.g., $K_{IMSI}$) with R and MAC-S as inputs, according to the following:

$$AK_1 = f5^*_K(R, \text{MAC-S}) \tag{6}$$

By using (6), an AUTS that protects $\text{SQN}_{MS}$ from replay attacks can be generated according to the following:

$$\text{AUTS} = \text{SQN}_{MS} \oplus AK_1 \| \text{MAC-S} \tag{7}$$

In some aspects, the first MAC (e.g., MAC-S) may be generated (e.g., using (4)) based on the key shared by the network and the UE, the random challenge, and a first sequence number (e.g., $\text{SQN}_{MS}$). In some aspects, the authentication request (e.g., at 802) may include additional authentication parameters (e.g., AUTN). For example, the authentication request may include a second sequence number (e.g., $\text{SQN}_{HE}$) and a second MAC (e.g., MAC in AUTN). The second MAC may be generated based on the first key shared by the network and the UE (e.g., $K_{IMSI}$), the random challenge, and the second sequence number (e.g., $\text{SQN}_{HE}$) (e.g., using (2)). The first sequence number (e.g., $\text{SQN}_{MS}$) may be a sequence number associated with the UE that is maintained in the UE, and the second sequence number (e.g., $\text{SQN}_{HE}$) may be a sequence number associated with the UE that is maintained in the network.

In some aspects, the UE may detect a synchronization failure after receiving the authentication request (e.g., at 802). For example, the UE may detect a synchronization failure after determining that a value of the sequence number (e.g., $\text{SQN}_{HE}$) sent with the authentication request is not within a predetermined range of sequence number values.

In some aspects, after transmitting the synchronization parameter (e.g., at 806), the UE may receive another authentication request that includes a sequence number (e.g., $\text{SQN}_{HE} = \text{SQN}_{MS} + \text{threshold}$) from the network. The sequence number (e.g., $\text{SQN}_{HE} = \text{SQN}_{MS} + \text{threshold}$) may be set based on the first sequence number (e.g., $\text{SQN}_{MS}$). If the UE detects that the value of the sequence number (e.g., $\text{SQN}_{HE} = \text{SQN}_{MS} + \text{threshold}$) is within a predetermined range of sequence number values, the UE may transmit an authentication response to the network.

Figure 10:
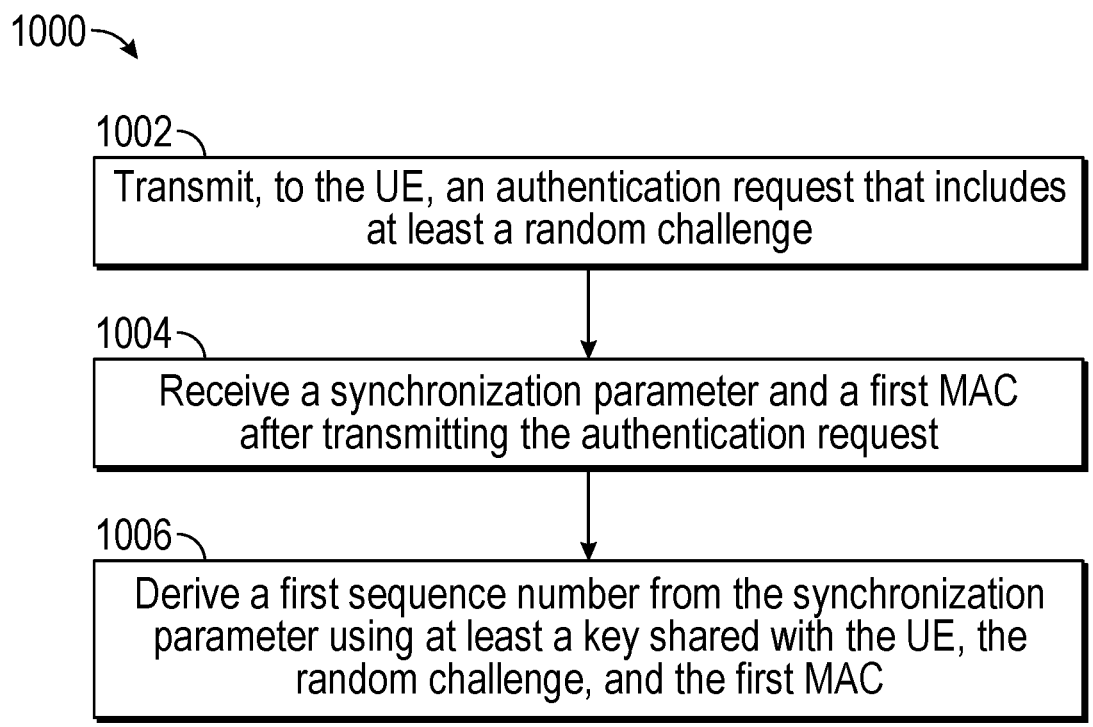
FIG. 10 is a flow diagram illustrating example operations for wireless communications, in accordance with certain aspects of the present disclosure.

FIG. 10 illustrates example operations 1000 for wireless communications, according to certain aspects of the present disclosure. The operations 1000 may be performed, for example, by a network entity (e.g., CN node 132a, one or more components of a visitor/home network, such as CN 130, etc.) for authenticating a UE for subsequent communications with the UE. Operations 1000 may be implemented as software components that are executed and run on one or more processors of the network entity (e.g., processor(s) of CN node 132a). Further, the transmission and reception of signals by the network entity in operations 1000 may be enabled, for example, by one or more antennas of the network entity. In certain aspects, the transmission and/or reception of signals by the network entity may be implemented via a bus interface of one or more processors obtaining and/or outputting signals.

Operations 1000 begin at 1002, where the network entity transmits, to the UE, an authentication request (e.g., user authentication request) that includes at least a random challenge (e.g., R). At 1004, the network entity receives a synchronization parameter (e.g., AUTS) and a first MAC (e.g., MAC-S) after transmitting the authentication request. At 1006, the network entity derives a first sequence number (e.g., $SQN_{MS}$) from the synchronization parameter using at least a key (e.g., $K_{IMSI}$) shared with the UE, the random challenge, and the first MAC.

In some aspects, the first authentication request may further include a second sequence number (e.g., $SQN_{HE}$) and a second MAC (e.g., MAC in AUTN). The second MAC may be generated based on the key shared with the UE and the network entity, the random challenge, and the second sequence number (e.g., $SQN_{HE}$).

In some aspects, the network entity may transmit, in response to the receipt of the synchronization parameter, a second authentication request that includes a second sequence number (e.g., $SQN_{HE}=SQN_{MS}$+threshold) set based on the first sequence number (e.g., $SQN_{MS}$).

Figure 11:
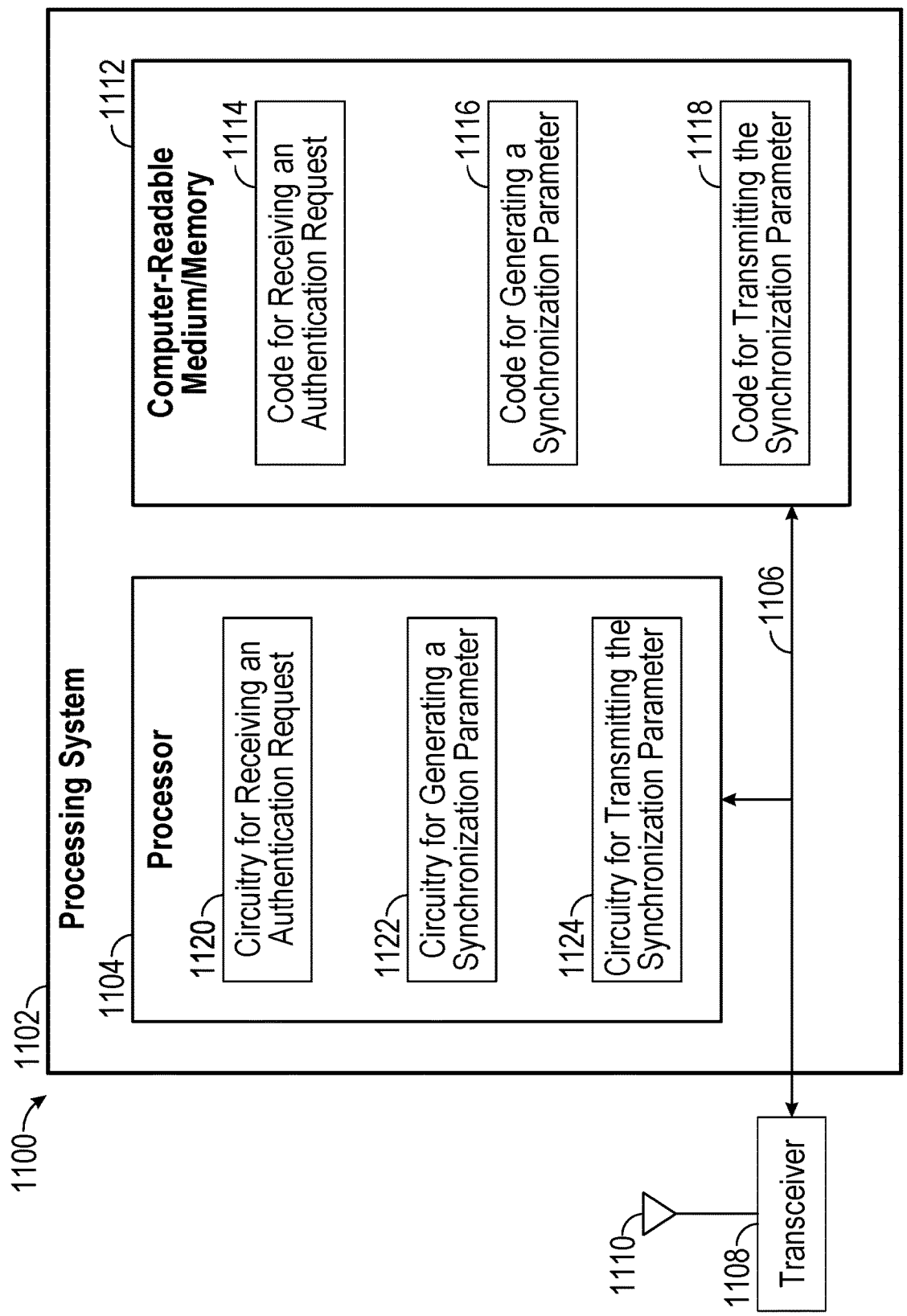
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for receiving, from a network, an authentication request including at least a random challenge; code 1116 for generating, after receiving the authentication request, a synchronization parameter based at least in part on a key shared by the network and the UE, the random challenge, and a first MAC; and code 1118 for transmitting, in response to the authentication request, the synchronization parameter and the first MAC to the network. In certain aspects, the processor 1104 has circuitry configured to implement the code stored in the computer-readable medium/memory 1112. The processor 1104 includes circuitry 1120 for receiving, from a network, an authentication request including at least a random challenge; circuitry 1122 for generating, after receiving the authentication request, a synchronization parameter based at least in part on a key shared by the network and the UE, the random challenge, and a first MAC; and circuitry 1124 for transmitting, in response to the authentication request, the synchronization parameter and the first MAC to the network.

Figure 12:
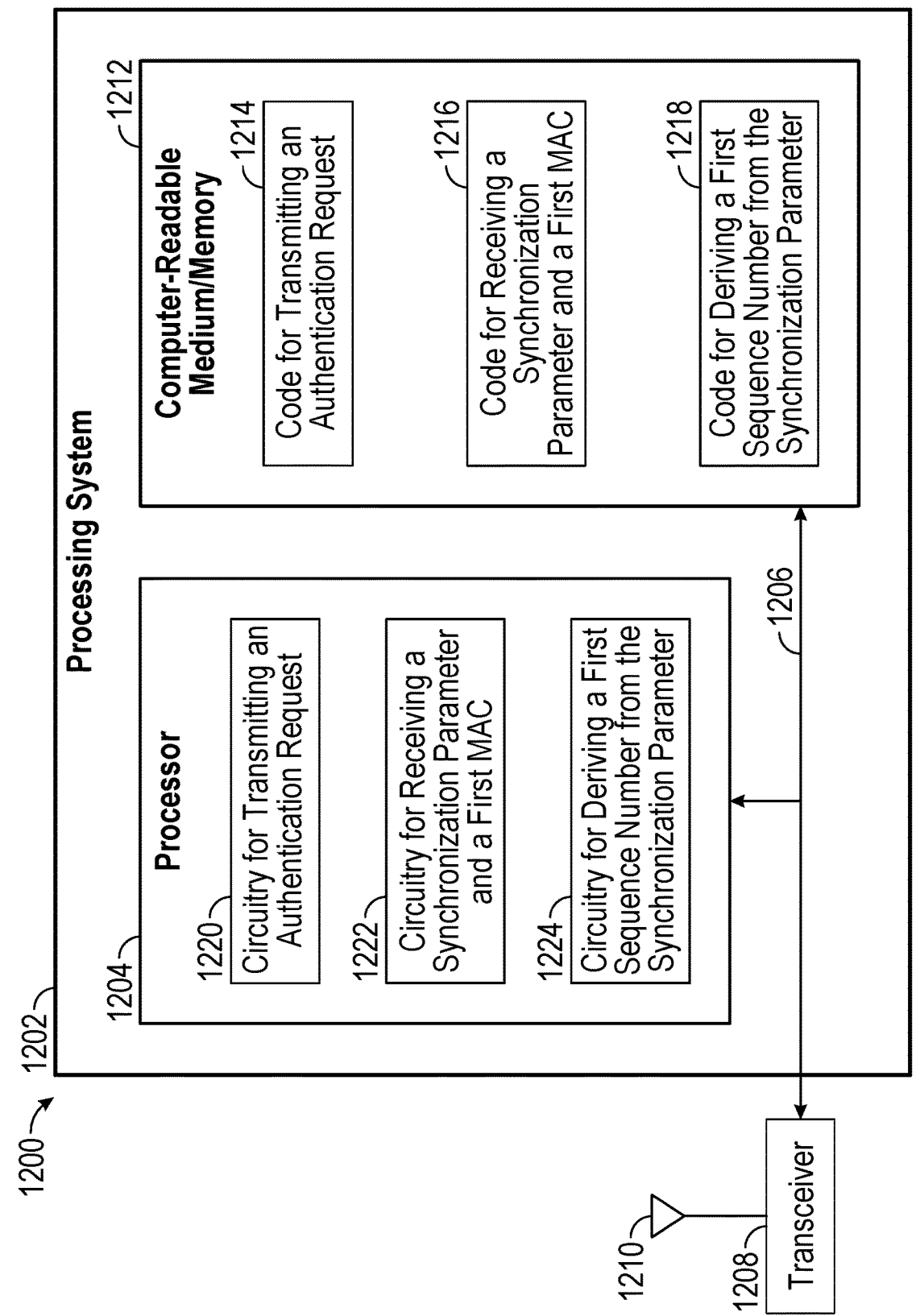
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein. In certain aspects, computer-readable medium/memory 1212 stores code 1214 for transmitting, to a UE, an authentication request that includes at least a random challenge; code 1216 for receiving a synchronization parameter and a first MAC after transmitting the authentication request; and code 1218 for deriving a first sequence number from the synchronization parameter using at least a key shared with the UE, the random challenge, and the first MAC. In certain aspects, the processor 1204 has circuitry configured to implement the code stored in the computer-readable medium/memory 1212. The processor 1204 includes circuitry 1220 for transmitting, to a UE, an authentication request that includes at least a random challenge; circuitry 1222 for receiving a synchronization parameter and a first MAC after transmitting the authentication request; and circuitry 1224 for deriving a first sequence number from the synchronization parameter using at least a key shared with the UE, the random challenge, and the first MAC.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems, e.g., 2G wireless technology.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for authenticating a network for wireless communications by a user equipment (UE), comprising:
   receiving, from the network, an authentication request comprising at least a random challenge;
   after receiving the authentication request, generating a synchronization parameter based at least in part on a key shared by the network and the UE, the random challenge, and a first message authentication code (MAC), wherein generating the synchronization parameter comprises:
      generating the first MAC using a first function, wherein the key shared by the network and the UE, the random challenge, and a first sequence number are inputs into the first function; and
      generating an anonymity key (AK) using a second function, wherein the random challenge, the first MAC, and the key shared by the network and the UE are inputs into the second function;
   transmitting, in response to the authentication request, the synchronization parameter to the network;
   after transmitting the synchronization parameter, receiving another authentication request comprising a second sequence number from the network, wherein the second sequence number is set based on the first sequence number;
   detecting that a value of the second sequence number is within a predetermined range of sequence numbers; and
   transmitting an authentication response to the network after the detection.

2. The method of claim 1, wherein:
   the first sequence number is a sequence number associated with the UE that is maintained in the UE; and
   the second sequence number is a sequence number associated with the UE that is maintained in the network.

3. The method of claim 1, further comprising detecting a synchronization failure by determining that a value of a sequence number received with the authentication request is not within a predetermined range of sequence number values.

4. An apparatus for wireless communications, comprising:
   a receiver configured to receive, from a network, an authentication request comprising at least a random challenge;
   at least one processor configured to generate a synchronization parameter based at least in part on a key shared by the network and the apparatus, the random challenge, and a first message authentication code (MAC), wherein, to generate the synchronization parameter, the at least one processor is configured to:
      generate the first MAC using a first function, wherein the key shared by the network and a user equipment (UE), the random challenge, and a first sequence number are inputs into the first function; and
      generate an anonymity key (AK) using a second function, wherein the random challenge, the first MAC, and the key shared by the network and the UE are inputs into the second function;
   a transmitter configured to transmit, in response to the authentication request, the synchronization parameter to the network; and a memory coupled to the at least one processor, wherein:

the receiver is further configured to receive, after transmission of the synchronization parameter, another authentication request comprising a second sequence number from the network, wherein the second sequence number is set based on the first sequence number;

the at least one processor is further configured to detect that a value of the second sequence number is within a predetermined range of sequence numbers; and the transmitter is further configured to transmit an authentication response to the network after the detection.

5. The apparatus of claim 4, wherein:

the first sequence number is a sequence number associated with the apparatus that is maintained in the UE; and the second sequence number is a sequence number associated with the apparatus that is maintained in the network.

6. The apparatus of claim 4, wherein the at least one processor is configured to detect a synchronization failure by determining that a value of a sequence number received with the authentication request is not within a predetermined range of sequence number values.

\* \* \* \* \*